United States Patent [19]
Wicks

[11] Patent Number: 5,942,969
[45] Date of Patent: Aug. 24, 1999

[54] TREASURE HUNT GAME USING PAGER AND PAGING SYSTEM

[75] Inventor: James E. Wicks, San Francisco, Calif.

[73] Assignees: Sony Corporation, Japan; Sony Electronics, Park Ridge, N.J.

[21] Appl. No.: 08/792,858

[22] Filed: Jan. 23, 1997

[51] Int. Cl.$^6$ .................................................. G08B 9/00
[52] U.S. Cl. .............................. 340/286.02; 340/323 R; 340/825.44; 340/825.47; 273/454
[58] Field of Search .......................... 340/286.02, 311.1, 340/323 R, 825.44, 825.47, 825.46, 905; 273/454, 455, 457, 460

[56] References Cited

U.S. PATENT DOCUMENTS

| | | |
|---|---|---|
| 4,415,065 | 11/1983 | Sandstedt . |
| 4,496,149 | 1/1985 | Schwartzberg ........................... 273/454 |
| 4,644,351 | 2/1987 | Zabarsky et al. ................... 340/825.44 |
| 4,951,039 | 8/1990 | Schwendeman et al. . |
| 4,961,575 | 10/1990 | Perry ....................................... 273/454 |
| 5,045,850 | 9/1991 | Andros et al. ...................... 340/825.44 |
| 5,142,279 | 8/1992 | Jasinski et al. ..................... 340/825.44 |
| 5,173,688 | 12/1992 | DeLuca et al. . |
| 5,236,200 | 8/1993 | McGregor et al. ...................... 273/459 |
| 5,331,431 | 7/1994 | Jasinski . |
| 5,446,678 | 8/1995 | Saltzstein et al. . |
| 5,452,356 | 9/1995 | Albert . |
| 5,481,255 | 1/1996 | Albert et al. . |
| 5,491,785 | 2/1996 | Robson et al. . |
| 5,495,344 | 2/1996 | Callaway, Jr. et al. . |
| 5,508,695 | 4/1996 | Nelson et al. . |
| 5,535,428 | 7/1996 | King et al. . |
| 5,613,212 | 3/1997 | Wong et al. ......................... 340/311.1 |

*Primary Examiner*—Jeffery A. Hofsass
*Assistant Examiner*—Davetta Woods
*Attorney, Agent, or Firm*—Ronald P. Kananen

[57] ABSTRACT

A game can be played using pagers and a paging system. Game participants receive information and clues from the paging system directing them to a particular landmark or location. Once there, the participants signal the system with a response which is dependent on their being at the correct location. The paging system then additionally determines that the participant is transmitting from roughly the correct location. When the participant is thus verified as being at the correct location, the next clue is transmitted to the participant. This continues until a participant correctly deciphers all the clues and arrives at the end of the game.

12 Claims, 3 Drawing Sheets

5,942,969

TREASURE HUNT GAME USING PAGER AND PAGING SYSTEM

FIELD OF THE INVENTION

The present invention relates generally to the field of wireless pagers. More particularly, the present invention relates to the application of wireless pager technology to a treasure hunt game or other game for pager users.

BACKGROUND OF THE INVENTION

Portable radio receivers and transceivers, such as wireless pagers, have become increasingly popular as a means of communication. Pagers are typically carried by users who wish or need to receive communications when they are away from a telephone or computer, or are unable to predict where they nay be reached at a given time.

In general, the user of a pager purchases the unit and enters into a contact with a service provider. As shown in FIG. 1, when someone 12 wishes to page a particular user, they contact the user's service provider 11, identify the user to be paged (perhaps with a personal identification number), and may give a message to the service provider 11 that is to be broadcast to the user's pager 15.

The service provider 11 maintains a network of radio transceiver base stations 13, 14 which are spread throughout the service area covered by the service provider. The transmitting base stations 13 are distributed so that transmissions from at least one base station can be received by a pager 15 anywhere in the service area.

In a simplistic system, when the service provider 11 receives a request to page a user 15, the page is broadcast by all the base stations 13 in the system. Thus, if the pager 15 is located anywhere in the service area, it will receive the page. The pager 15 will then alert the user that a page has been received with, for example, an audible or vibratory alert signal.

In a more sophisticated system, the pager 15 may have the capability to not only receive a transmission from the service provider's system, but also to transmit an answer back to the system. This is referred to as two-way paging.

With these advances, the usefulness of pagers as a means of communication has expanded rapidly. Service providers have encouraged this expansion by experimenting with pagers as a means to disseminate information of interest to pager users. For example, as described in U.S. Pat. No. 5,508,695 to Nelson et al., incorporated herein by reference, a one-way pager system is used to relay sports or financial information to a pager user who has contracted with the service provider for that service.

However, there are many potential, undiscovered applications of pager technology which may provide pager users with, as yet unheard of, abilities to communicate. This is particularly true of the developing two-way pager systems. Accordingly, there is a need for improved methods and applications of pager technology to meet the information, recreation and communication demands of pager users.

Games as a form of recreation or commercial marketing are also extremely popular and varied in modern society. However, despite the wide pool of pager users who both seek recreation and provide an attractive marketing audience, there are no games either solely for recreation or as part of a marketing strategy which make use of pager technology. Accordingly, there is a need for a pager technology that can be used to provide recreational gaming for pager users.

SUMMARY OF THE INVENTION

It is an object of the present invention to meet the above identified needs and others. Particularly, it is an object of the present invention to provide a pager technology and system with which pager users can engage in recreational gaming, specifically a treasure hunt.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve the stated and other objects of the present invention, as embodied and described below, the invention may comprise:

A method of playing a game using pagers and a paging system comprising the steps of: providing a paging system; transmitting with the paging system messages about the game to a plurality of pagers which are being used by game participants; and receiving with the paging system messages from the plurality of pagers about the game, wherein the received messages are in response to the transmitted messages.

The game of the present invention may be a treasure hunt and the step of transmitting messages with the paging system may comprise transmitting clues directing game participants to a particular location. A question may be associated with each of the clues, an answer to which may be determined at the particular location. The method may further comprise the step of posting the answer to the question at the particular location.

The method may also comprise the steps of: inputting the answer to one of the pagers; and transmitting the answer to the paging system with the pager. These steps may be followed by the steps of: receiving the answer transmitted by the pager; determining the correctness of the answer; and transmitting a response with the paging system based on the correctness of the answer.

Additionally, the method of the present invention may comprise the steps of: receiving the answer transmitted by the pager; determining with the paging system the area from which the answer was transmitted; determining whether the area is the area from which the answer should be transmitted in accordance with the clue; and transmitting a response to the answer based on whether the area is the area from which the answer should be transmitted in accordance with the clue.

The present invention may also comprise a game using pagers and a paging system comprising: a paging system; and a plurality of pagers capable of receiving messages from the paging system, receiving input from a game participant, and transmitting the input to the paging system; wherein the messages received from the paging system comprise information about the game and the input comprises information about the game which is in response to the messages received from the paging system.

As before, the game of the present invention may be a treasure hunt and the messages transmitted by the paging system may comprise clues directing game participants to a particular location. A question may be associated with each of the clues, an answer to which may be determined at the particular location. Accordingly, the game may include a posting of the answer at the particular location.

The plurality of pagers may each comprise: means for inputting the answer; and means for transmitting the answer to the paging system. The paging system may comprise: means for receiving the transmitted answer; means for determining the correctness of the means for transmitting a response based on the correctness of the answer.

The paging system may also comprise: means for receiving the transmitted answer; means for determining the area from which the answer was transmitted; means for determining whether the area is the area from which the answer should be transmitted in accordance with the clue; and means for transmitting a response to the answer based on whether the area is the area from which the answer should be transmitted in accordance with the clue.

BRIEF DESCRIPTION OF THE DRAWINGS

The accompanying drawings illustrate the present invention and are a part of the specification. Together with the following description, the drawings demonstrate and explain the principles of the present invention. In the drawings.

DETAILED DESCRIPTION OF THE PREFERRED EMBODIMENT

Using the drawings, the preferred embodiment of the present invention will now be explained. It should be noted that, given the broad concept of the invention, a wide variety of games based on a treasure hunt theme or other themes will be obvious to those practiced in the art. The following description is a preferred variation from these possibilities and is not intended to limit the scope of the present invention.

Under the principles of the present invention, the pager user may arrange with the service provider to participate in a treasure hunt or other game with his or her pager. The service provider may charge a fee for game participation or the game may be supported by commercial sponsors.

The treasure hunt is thus organized and scheduled by the service provider who may advertise the game, notify potential players, offer prizes, and accept participants. The service provider may require the participants to assemble for the beginning of the game. As an alternative, the game may be commenced by a page signalling the start of the game which is transmitted to all participants wherever they may be within the game area.

In the preferred embodiment, the treasure hunt game is played by transmitting a series of clues each of which leads the participants to a particular landmark or geographic area. Once a participant has arrived at the correct place, his or her presence at the correct place is established and the service provider then sends the next clue to that participant. The game ends when the first participant to solve all the clues arrives at the end of the treasure hunt.

Figure 3:
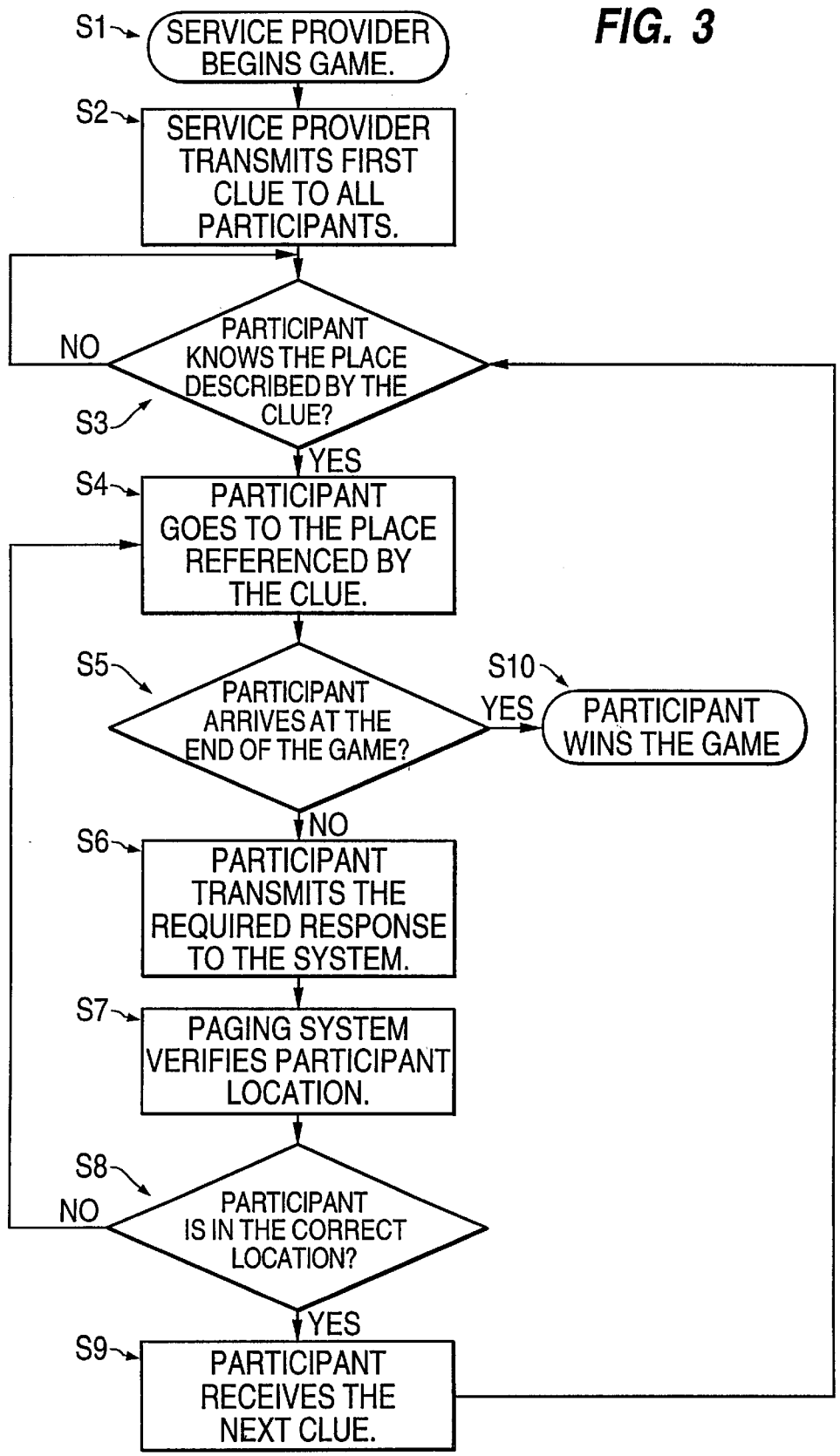
FIG. 3 is a flow chart illustrating the principles of the present invention.

This process is illustrated in detail in FIG. 3. As shown, the service provider commences the game at step S1. At step S2, the service provider transmits the first clue to all participants. It should be noted that steps S1 and S2 may be combined into a single action.

Figure 2:
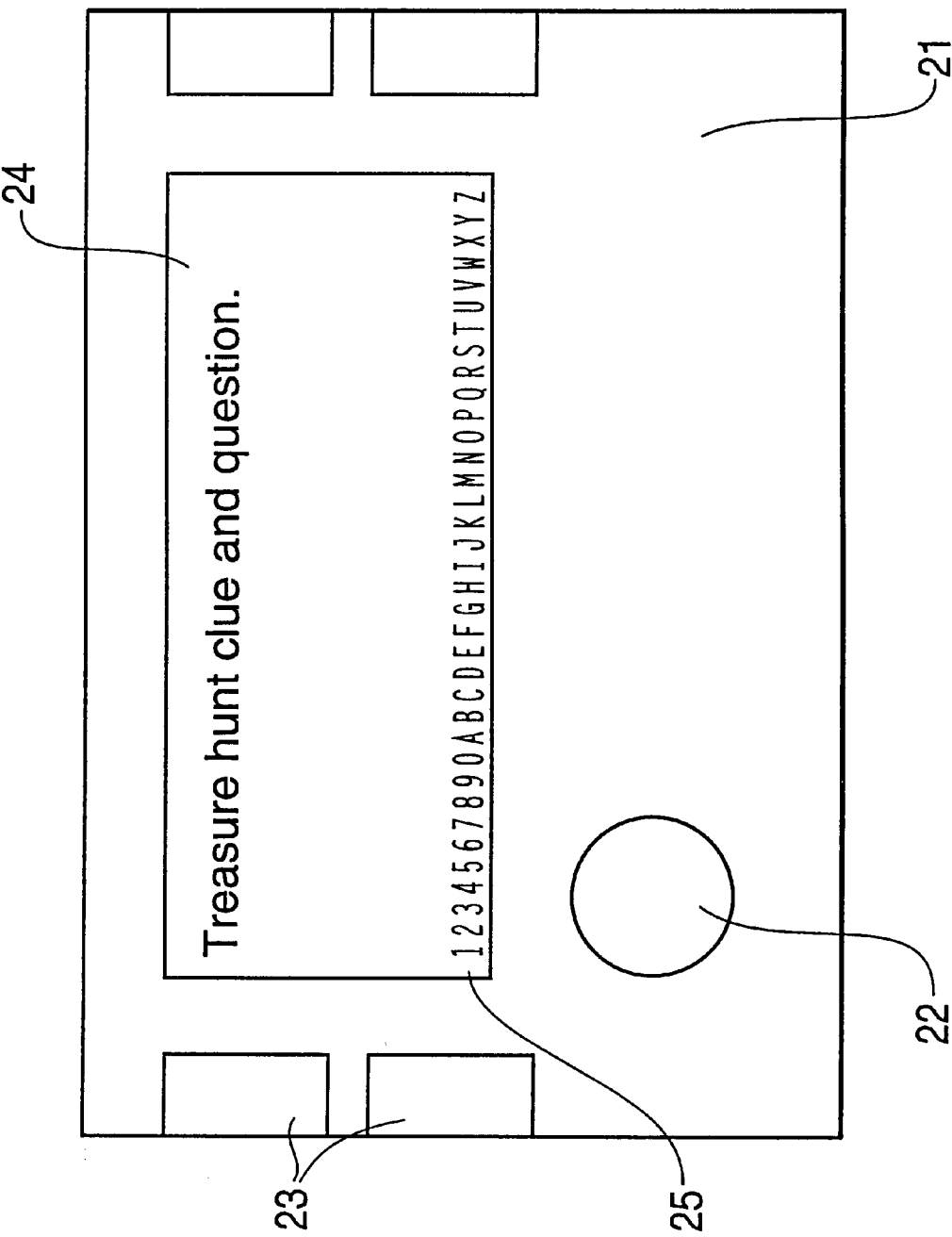
FIG. 2 is a diagram of a pager according to the principles of the present invention.

As shown in FIG. 2., the participants in the game receive the transmitted clue from the service provider with their individual pagers. In the preferred embodiment, the clue will lead the participant to a particular geographic area or landmark within an area in which the game is to be played. As shown in step S3, the participants must study the transmitted clue until they figure out where the clue is directing them.

In step S4, when a participant understands the clue, he or she will go to the place or landmark indicated. When the participant arrives at the correct place referenced by the clue, he or she will be eligible to receive the next clue. To preserve the integrity of the game and prevent cheating, the service provider must have some means of verifying that the participant has in fact solved the clue and arrived at the correct location. This can be accomplished in two basic ways, both of which are used together in this preferred embodiment to complement each other.

The first method of verifying a participant's location is to request from the participant information which can only be obtained at the site where the participant is supposed to be. For this reason, the game is obviously played with a two-way paging system.

For example, the service provider may post a numeric code or the like at the place where the participant is supposed to arrive based on the transmitted clue. In step S6, the participant verifies that he or she has arrived at the correct location by transmitting the posted code to the service provider.

Alternatively, the service provider may incorporate a question into the clue or associate a question with the clue, the answer to which is found at the location referenced by the clue. If the question is not incorporated into the clue, the service provider may transmit the question in response to a participant's indication that he or she has solved the clue and arrived at the correct location. For example, the clue may lead a participant to a particular landmark, and the associated question may ask what color something on or around the landmark is.

As shown in FIG. 2, the pager 21 of a participant in the game may be programmed with a virtual keyboard. The virtual keyboard appears on a display 24 of pager 21 and comprises, for example, a display of the numbers 0 to 9 and the alphabet.

When the participant is ready to demonstrate to the service provider that he or she has correctly solved the transmitted clue and arrived at the correct location, buttons 23 of pager 21 are used to move a cursor (not shown) over the virtual keyboard 25 of display 24.

When a letter or number which the participant wishes to input is highlighted by the cursor, the participant presses the select button 22. This process is repeated until the user has entered the posted numeric code or answered the question associated with the clue. The answer may appear on the display 24 as it is being entered so that the participant can see what will be transmitted. One skilled in the art will realize that many means of inputting alphanumeric input to a pager or other device would be equivalent to the virtual keyboard and could be used with the present invention.

In step S6 of FIG. 3, the participant transmits the entered response to the service provider. In step S7, the service provider will first verify that the participant has returned the correct response. If the response is incorrect, the service provider will transmit a message so indicating to the participant. The participant must then return to deciphering the clue.

If the response is correct, the service provider uses the paging system to make an additional check as to whether the participant is indeed at the correct location. This is possible because a two-way paging system can be used to determine the general location of a pager user who is transmitting messages to the paging system. Using this method, which will be described below, the pager user can determine that, not only has the participant returned the correct response, but is also transmitting from approximately the correct location referenced by the clue.

Figure 1:
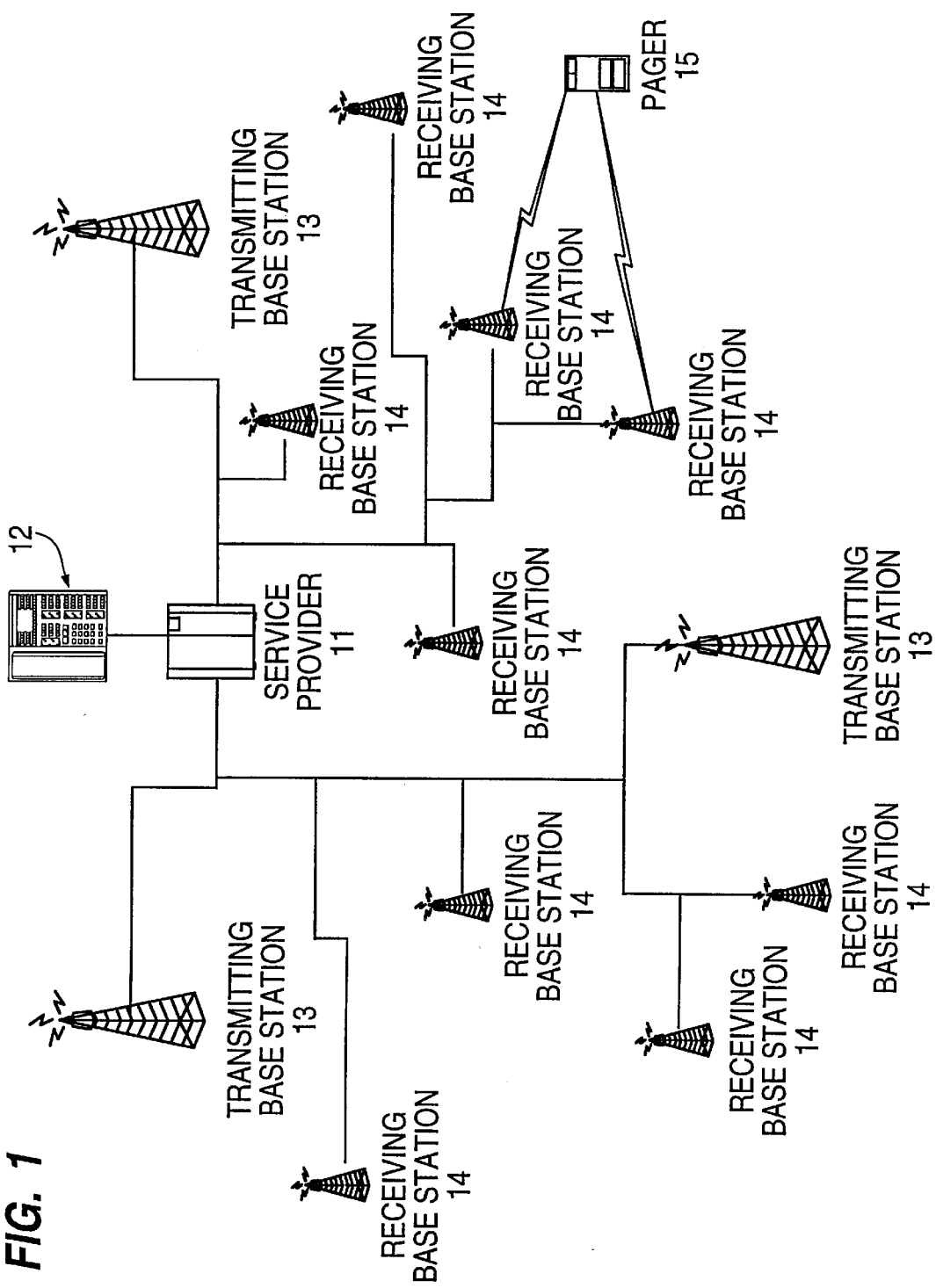
FIG. 1 is a schematic diagram of a conventional two-way paging network with which the present invention may be practiced.

With reference to FIG. 1, the method of determining the general location of a pager 15 using a two-way paging network will now be briefly described. Because the strength of a transmission from a pager 15 is tightly constrained by the battery power available to the pager, a two-way paging system must include a greater number of receiving base stations 14 than transmitting base stations 13.

The receiving base stations 14 are smaller and distributed more widely that transmitting base stations 13 in order to receive the relatively weak transmissions broadcast by individual pagers 15. The receiving base stations 14 must be sufficient in number and distribution to receive pager transmissions originating anywhere in the area served by the service provider.

In a two-way paging system, a transmission from a pager 15 may be received by one or more receiving base stations 14. By determining which base station 14 is receiving the pager signal or, if more than one base station is receiving the pager signal, which base station is receiving the stronger signal, the general location of the pager 15 and, thus, the pager user can be roughly determined. This is based on the generally true principle that the base station 14 receiving the strongest signal from the pager 15 is geographically closest to that pager. Thus, in step S7, the service provider can verify whether the game participant has returned the correct response and is transmitting from the general area where the clue should have directed the participant to go.

In step S8, if the participant returns the correct response and is transmitting from the correct area, the game moves to step S9 and the participant receives the next clue. This takes the participant back to step S3 and the process is repeated. If the participant either fails to transmit the correct response or is not transmitting from the correct location, the service provider will send the participant a message to try again.

As illustrated in step S5, the participant will eventually be lead by a clue to a place which is designated as the end of game. When the first participant arrives at the end of the game, he or she is declared the winner in step S10.

One skilled in the art will realize that the principles of the present invention could be applied to a number of other games and recreational activities. For example, the present invention may include a scavenger hunt game in which a list of items to be collected by participants is transmitted item by item to the participants as they signal the system that they have successfully collected the previously transmitted item.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A method of playing a game using pagers and a paging system comprising the steps of:

providing a paging system;

transmitting with said paging system, messages about said game to a plurality of pagers which are being used by game participants; and receiving with said paging system messages from said plurality of pagers about said game, wherein said received messages are in response to said transmitted messages;

wherein said game is a treasure hunt and said step of transmitting messages with said paging system comprises transmitting clues directing game participants to a particular location.

2. A method as claimed in claim 1, wherein said step of transmitting messages further comprises the step of associating a question with each of said clues, an answer to which may be determined at said particular location.

3. A method as claimed in claim 2, further comprising the step of posting said answer at said particular location.

4. A method as claimed in claim 2, further comprising the steps of:

inputting said answer to one of said pagers; and transmitting said answer to said paging system with said pager.

5. A method as claimed in claim 4, further comprising the steps of:

receiving said answer transmitted by said pager;

determining the correctness of said answer; and transmitting a response with said paging system based on the correctness of said answer.

6. A method as claimed in claim 4, further comprising the steps of:

receiving said answer transmitted by said pager;

determining with said paging system the area from which said answer was transmitted;

determining whether said area is the area from which said answer should be transmitted in accordance with said clue; and transmitting a response to said answer based on whether said area is the area from which said answer should be transmitted in accordance with said clue.

7. A game using pagers and a paging system comprising:

a paging system; and a plurality of pagers capable of receiving messages from said paging system, receiving input from a game participant, and transmitting said input to said paging system;

wherein said messages received from said paging system comprise information about said game and said input comprises information about said game which is in response to said messages received from said paging system;

wherein said game is a treasure hunt and said messages transmitted from said paging system comprise clues directing game participants to particular locations.

8. A game as claimed in claim 7, wherein said messages transmitted from said paging system further comprise a question associated with each of said clues, an answer to which may be determined at said particular location.

9. A game as claimed in claim 8, further comprising a posting of said answer at said particular location.

10. A game as claimed in claim 8, wherein said plurality of pagers each comprise:

means for inputting said answer; and means for transmitting said answer to said paging system.

11. A game as claimed in claim 10, wherein said paging system comprises:
- means for receiving said transmitted answer;
- means for determining the correctness of said answer; and
- means for transmitting a response based on the correctness of said answer.

12. A game as claimed in claim 10, wherein said paging system comprises:
- means for receiving said transmitted answer;
- means for determining the area from which said answer was transmitted;
- means for determining whether said area is the area from which said answer should be transmitted in accordance with said clue; and
- means for transmitting a response to said answer based on whether said area is the area from which said answer should be transmitted in accordance with said clue.

* * * * *